US007859224B2

(12) United States Patent
Baer et al.

(10) Patent No.: US 7,859,224 B2
(45) Date of Patent: Dec. 28, 2010

(54) CHARGE CONTROL CIRCUIT FOR A VEHICLE VACUUM CLEANER BATTERY

(75) Inventors: Mark E. Baer, Trout Run, PA (US); James M. Robitaille, Montoursville, PA (US); Neil N. Norell, Endicott, NY (US)

(73) Assignee: Shop-Vac Corporation, Williamsport, PA (US)

( * ) Notice: Subject to any disclaimer, the term of this patent is extended or adjusted under 35 U.S.C. 154(b) by 377 days.

(21) Appl. No.: 11/137,893

(22) Filed: May 26, 2005

(65) Prior Publication Data

US 2006/0267552 A1    Nov. 30, 2006

(51) Int. Cl.
*H02J 7/00*    (2006.01)
(52) U.S. Cl. .................... 320/128; 320/135
(58) Field of Classification Search .............. 320/106, 320/104, 127, 128, 135
See application file for complete search history.

(56) References Cited

U.S. PATENT DOCUMENTS

| | | | |
|---|---|---|---|
| 4,493,001 A | 1/1985 | Sheldrake | |
| 4,902,956 A | 2/1990 | Sloan | |
| 5,668,463 A | 9/1997 | Duley | |
| 5,677,614 A | 10/1997 | Ohmori et al. | |
| 5,973,944 A * | 10/1999 | Nork | 363/60 |
| 6,057,666 A | 5/2000 | Dougherty et al. | |
| 6,060,861 A | 5/2000 | Feng | |
| 6,094,031 A | 7/2000 | Shimane et al. | |
| 6,242,892 B1 | 6/2001 | Arnaud et al. | |
| 6,337,563 B2 | 1/2002 | Takimoto et al. | |
| 6,441,592 B1 * | 8/2002 | Rothleitner et al. | 323/267 |
| 6,489,748 B1 | 12/2002 | Okamura | |
| 6,492,792 B1 | 12/2002 | Johnson, Jr. et al. | |
| 6,621,249 B2 | 9/2003 | Inoue | |
| 6,677,725 B2 | 1/2004 | Tamai et al. | |
| 6,791,295 B1 | 9/2004 | Berels | |
| 6,794,848 B2 * | 9/2004 | Shinada et al. | 320/104 |
| 6,930,466 B2 * | 8/2005 | Bradley et al. | 320/133 |
| 7,298,113 B2 * | 11/2007 | Orikasa | 320/112 |

(Continued)

FOREIGN PATENT DOCUMENTS

WO    WO-01/71883    9/2001

(Continued)

OTHER PUBLICATIONS

Maxim/Dallas Semiconductor Application Note 132: "Quick-Charge IC Routes Step-Up Switcher Output to Battery," www.maxim-ic.com/an132, pp. 1-3 (1998).

(Continued)

*Primary Examiner*—Bao Q Vu
*Assistant Examiner*—Nguyen Tran
(74) *Attorney, Agent, or Firm*—Marshall, Gerstein & Borun LLP

(57) ABSTRACT

Disclosed herein is a battery charger control circuit having a voltage detector to generate a signal indicative of a source voltage level to select one of a first charging mode and a second charging mode, and a charge controller coupled to the voltage detector to enable charging in accordance with one of the first charging mode and the second charging mode based on the signal from the voltage detector. The first and second charging modes establish charging at differing, non-zero rates. The source voltage level may be sampled at a sampling rate to minimize power consumed by monitoring the source voltage level.

35 Claims, 2 Drawing Sheets

U.S. PATENT DOCUMENTS

Figure 1:
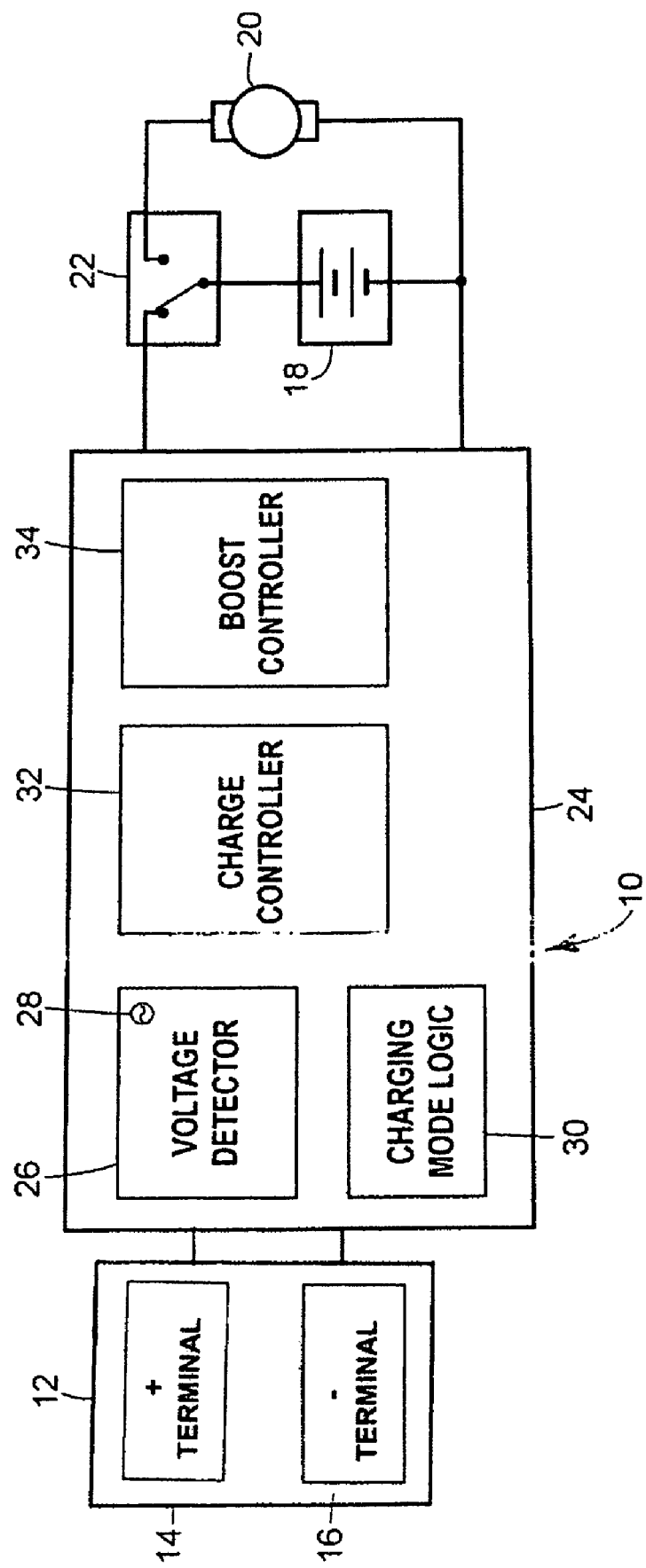

| | | | |
|---|---|---|---|
| 7,498,769 B1* | 3/2009 | Potanin et al. | 320/125 |
| 2003/0222621 A1* | 12/2003 | Howard et al. | 320/128 |
| 2004/0217739 A1 | 11/2004 | Cummings | |

OTHER PUBLICATIONS

Linear Technology Product Datasheet: "LTC1042 Window Comparator," pp. 1-8 (1988).

Maxim/Dallas Semiconductor Product Datasheet: "Maxim NiCd/NiMH Batter Fast-charge Controllers," pp. 1-17 (Apr. 2002).

Maxim/Dallas Semiconductor Product Datasheet: "Maxim 12V or Adjustable, High-Efficiency, Low Ig, Step-Up DC-DC Controller," pp. 1-16 (2002).

Maxim/Dallas Semiconductor Application Note 3282: "Maxim Fast-Charge Controller Charges 22-Cell NiCd/NiMH Battery," www.maxim-ic.com/appnotes.cfm/appnote_number/3282, pp. 1-4 (Jul. 2004).

Maxim/Dallas Semiconductor Application Note 149: "Maxim Battery Charger Indicates Trickle or Fast Charge," http://www.maxim-ic.com/appnotes.cfm/appnote_number/149, pp. 1-2 (1998).

Communication relating to the results of the partial international search in International (PCT) Application No. PCT/US2006/017533, dated Sep. 25, 2006.

International Preliminary Report on Patentability for Application No. PCT/US06/017533 dated Dec. 13, 2007.

\* cited by examiner

CHARGE CONTROL CIRCUIT FOR A VEHICLE VACUUM CLEANER BATTERY

BACKGROUND OF THE INVENTION

1. Field of the Invention

The invention generally relates to battery charge control circuits and, more particularly, to a charge control circuit for an auxiliary battery charged by a primary vehicle battery.

2. Brief Description of Related Technology

Charge control circuits for regulating the charging of Nickel-Cadmium (NiCd), Nickel-Metal-Hydride (NiMH), and other rechargeable batteries from a DC source are well known. In fact, a portion of the circuitry involved in such circuits is made available commercially as a discrete integrated circuit (IC). Such ICs are often referred to as charge controllers. One commercially available charge controller IC is a pin-programmable, fast-charge controller from Maxim Integrated Products under product number MAX712 or MAX713 (www.maxim-IC.com, Sunnyvale, Calif.).

Circuits for charging batteries often employ a control or feedback scheme based on an evaluation of the voltage of the battery cell(s) being charged. For example, a battery charging circuit may facilitate low-current charging, or trickle charging, until the battery cell being charged reaches a threshold voltage. Other characteristics of the battery cell(s) being charged, such as charging current and battery temperature, have also been evaluated to control charging.

In many cases, these charge control circuits are applied in the context of a power source of effectively infinite capacity. The control circuit is thus designed without regard to whether the power source could be adversely affected by the charging operation. However, in cases where one battery is charging another, the discharging of the source battery may need to be regulated.

The discharging of a vehicle battery has been regulated to ensure sufficient capacity for engine start via, for example, the operation of a starter motor. Complicating matters somewhat, vehicle batteries exhibit large voltage swings based on whether the engine is running or, more specifically, whether an alternator is operating to convert mechanical power to electrical power. For instance, a typical 12-volt, automobile battery may be at approximately 13.8 Volts with the alternator operating.

Without the power supplied by the alternator, the voltage of the vehicle battery drops noticeably with the use of accessories requiring significant power or current. Once the vehicle battery drops below a threshold voltage, past discharge regulators have prohibited certain accessory use. But despite such voltage drops, the vehicle battery may nevertheless have sufficient capacity to power certain, low-power accessories, particularly if the power consumption of such accessories could be regulated in response to the condition of the vehicle battery. In this manner, power consumption by a vehicle accessory may be permissible well after the engine has stopped running and the voltage of the vehicle battery has decreased.

SUMMARY OF THE INVENTION

Disclosed herein is a battery charger control circuit having a voltage detector and a charge controller coupled to the voltage detector. The voltage detector generates a signal indicative of a source voltage level to select one of a first charging mode and a second charging mode, and the charge controller enables charging in accordance with one of the first charging mode and the second charging mode based on the signal from the voltage detector. The first and second charging modes establish charging at differing, non-zero rates.

In some embodiments, the voltage detector includes a window comparator such that the signal is one of first and second control signals generated by the window comparator to indicate whether the source voltage level is below, within, or above a voltage window set by the window comparator. The battery charger control circuit may further include a control switch to determine whether the charge controller should be powered based on whether the first and second control signals indicate that the source voltage level is below the voltage window. The battery charger control circuit may still further include an OR gate responsive to the first and second control signals to drive the control switch.

The charge controller may include a fast-charge controller integrated circuit such that the first and second charging modes correspond with trickle and fast charging, respectively. The signal indicative of the source voltage level may then be provided to a temperature threshold pin of the fast-charge controller integrated circuit to disable fast charging.

In some embodiments, the battery charger control circuit further includes a step-up, DC-DC controller coupled to the charge controller. The step-up, DC-DC controller may include a switching regulator.

The voltage detector may include an oscillator to enable sampling of the source voltage level.

The battery charger control circuit may be used in combination with a source battery that provides the source voltage level. The first and second charging modes may be two of a plurality of operational modes of the battery charger control circuit. The plurality of operational modes may include a non-charging mode, and the voltage detector may be connected to the source battery to monitor the source voltage level regardless of the operational mode of the battery charger control circuit.

In accordance with another aspect, a vehicle electrical system has primary and secondary batteries, and a control circuit coupling the secondary battery to the primary battery to control recharging of the secondary battery via the primary battery. The control circuit includes a voltage detector that generates a signal indicative of the terminal voltage of the primary battery to select one of a first charging mode and a second charging mode. The control circuit also includes a charge controller that enables charging of the secondary battery in accordance with one of the first and second charging modes based on the signal from the voltage detector. The first and second charging modes establish charging at differing, non-zero rates.

In some embodiments, the voltage detector uses the terminal voltage of the primary battery as a power supply.

In accordance with yet another aspect, a battery charger control circuit includes a window comparator to generate first and second signals collectively indicative of whether a source voltage level is below, within or above a voltage window to select one of a plurality of operational modes. The window comparator has an oscillator to establish a sampling rate such that the source voltage level is sampled at the sampling rate to minimize power consumed by monitoring the source voltage level. The battery charger control circuit further includes a charge controller coupled to the window comparator to enable charging in accordance with the selected operational mode.

In some embodiments, the plurality of operational modes includes first and second charging modes that establish charging at differing, non-zero rates. The plurality of operational modes may include a non-charging mode. The voltage detector may be in communication with the source voltage level such that the voltage detector monitors the source voltage level during the non-charging mode.

The battery charger control circuit may further include a control switch controlled by at least one of the first and second signals to determine whether the charge controller is powered. The battery charger control circuit may still further include an OR gate coupling the window comparator and the control switch such that either one of the first and second signals may activate the control switch to allow the charge controller to be powered.

BRIEF DESCRIPTION OF THE DRAWING FIGURES

Figure 2:
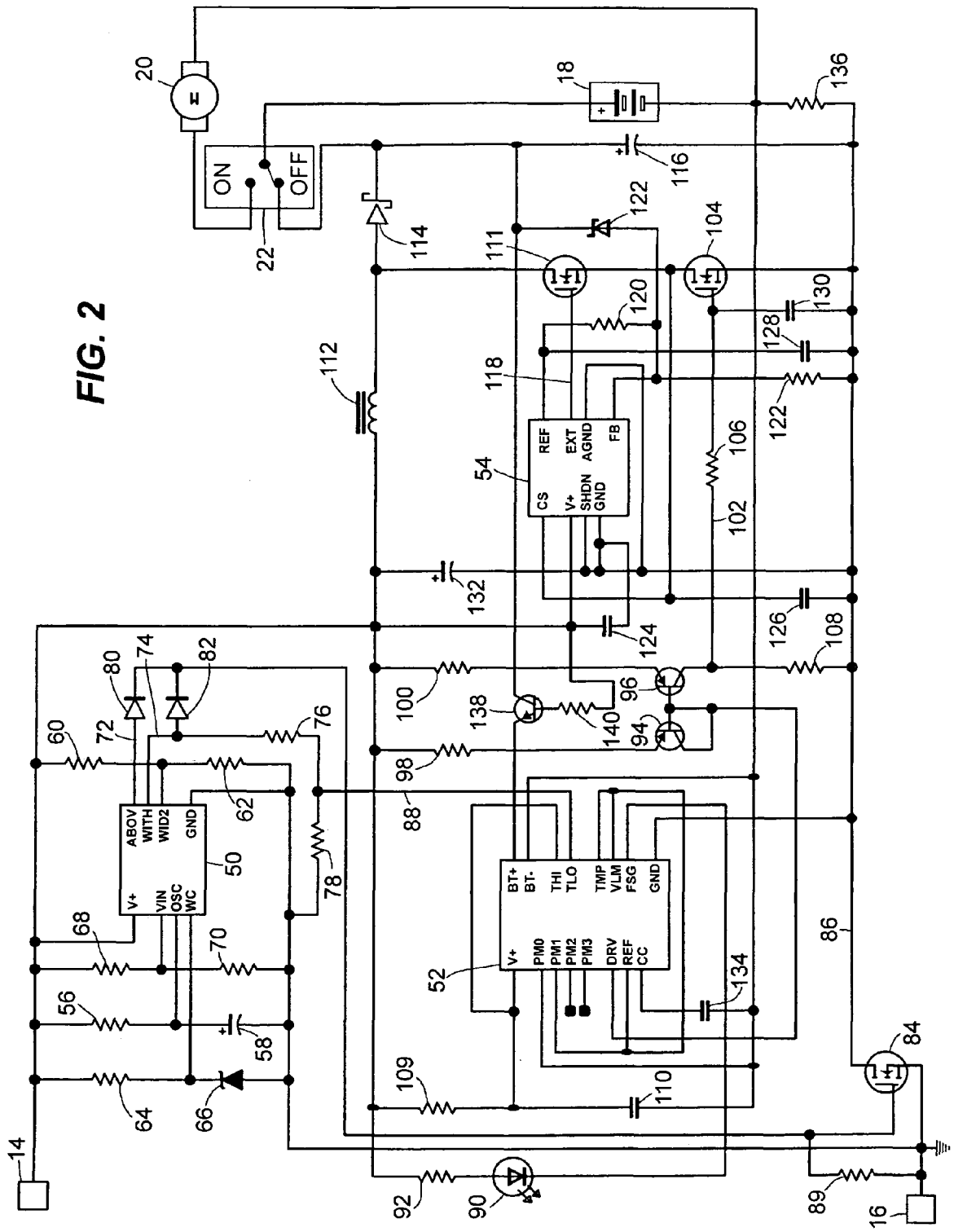

For a more complete understanding of the invention, reference should be made to the following detailed description and accompanying drawing wherein:

FIG. 1 is a block diagram of a vehicle electrical system having a battery charger control circuit in accordance with one embodiment; and, FIG. 2 is a circuit schematic depicting the vehicle electrical system and the battery charger control circuit of FIG. 1 in greater detail and in accordance with one embodiment.

While the disclosed system and circuit are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF THE INVENTION

The invention generally relates to a system and circuit for charging a battery where another battery, such as a vehicle battery, is acting as the power source. Controlling such charging may be useful in circumstances where unregulated discharging of the source battery may be problematic. For instance, use of the disclosed system and circuit ensures that a vehicle battery will maintain sufficient capacity for an engine start, despite acting as the power source for charging a secondary, or auxiliary, battery. The secondary battery may be used in connection with powering an accessory installed in the vehicle, such as a vacuum cleaner system. Operation of the disclosed circuit or system is fully automatic, thereby maintaining the vacuum cleaner system in a ready-to-use condition, without the need for intervention from an operator or user.

While the disclosed system and circuit are described herein in a vehicular context, and in connection with a vacuum cleaner accessory application, practice of the disclosed system and circuit is not limited to any such context or application. Rather, the disclosed system and circuit may be useful in a number of different applications in which a secondary, or auxiliary, battery is charged by a primary, or main, battery acting as the power source.

Generally speaking, the voltage of the primary battery is monitored to control and adjust the power consumption effected by the charging of the secondary battery. The power consumption is adjusted via selection of one of several operational modes, which include multiple charging modes and a non-charging mode. The primary battery may be monitored such that power consumption is minimized (i.e., consumed in an energy-efficient manner), which, in turn, allows the voltage to be continually monitored. Continual monitoring of the primary battery voltage involves detecting the voltage repeatedly during all of the operational modes, and under all conditions. For instance, the voltage may be monitored after the primary battery capacity has decreased to a point where further charging of the secondary battery is not permitted (i.e., the non-charging mode), because the monitoring consumes such little power. Circuit elements detect whether the vehicle engine is running, to what condition the electrical system is loaded, and whether it is safe to divert power to the battery charging system for the accessory (e.g., the vacuum cleaner system). The safety of the diversion is premised upon the requirement that nothing within the disclosed system or circuit will compromise the vehicle engine starting function.

With reference now to FIG. 1, a vehicle electrical system indicated generally at 10 includes a primary battery 12 having a positive terminal 14 and a negative terminal 16. The voltage across the positive and negative terminals 14, 16 provides a power source for any number of vehicle accessories, including audio equipment, power windows, power door locks, and the like. (not shown). The primary battery 12 serves as the direct or indirect power source for most, if not all, of the electrical equipment and devices associated with the vehicle, though some vehicle accessories, such as security systems, may have a supplemental power source. One or more of these vehicle accessories may cause the terminal voltage to fluctuate as load conditions vary, or to decrease over time due to degradation in battery capacity. While an alternator (not shown) may assist in the recharging of the primary battery 12 via conversion of mechanical energy generated by the engine, there may be extended periods of time between instances of engine operation. In such cases, regulating the discharging of the primary battery 12 in accordance with the disclosed circuit and system may help ensure that sufficient capacity is available for the starter motor, which typically requires significant current to crank the engine.

The primary battery 12 in automotive vehicles is typically a lead-acid battery, but the type of battery used as the primary, or source, battery is not germane to the practice of the disclosed system and circuit. In fact, application of the disclosed system and circuit may be advantageous in connection with any power source susceptible to undesirable degradation in capacity. Lead-acid and other batteries often exhibit a decreased terminal voltage after an excessive or significant amount of use. In circumstances when the vehicle engine will not be running, the terminal voltage may also decrease with the operation of one or more vehicle accessories. For example, a standard, "12-Volt" automotive battery may rise to about 13.8 Volts or higher during engine operation, but voltage levels as low as 12.6 Volts are generally regarded as fully, or highly, charged with sufficient capacity for powering certain accessories. Terminal voltages between about 12.4 and about 12.6 Volts may indicate a decreased capacity for powering accessories, and voltages below that range may be avoided to reserve sufficient starting capacity. The disclosed system and circuit generally distinguishes between these voltages or voltage ranges to select an operational mode appropriate for the condition of the vehicle battery 12. Of course, other voltages or voltage ranges may be used in alternative embodiments where, for instance, other source batteries are applicable, and where discharge, terminal voltage, or other characteristics may differ.

The vehicle electrical system 10 includes a secondary, or accessory, battery 18 coupled to the vehicle battery 12. The secondary, or auxiliary, battery 18 may be any type of rechargeable battery suitable for the vacuum cleaner system or other vehicle accessory or load to be powered by the secondary battery 18. The secondary battery 18 may be composed of any number of cells arranged in series, each of which may have any cell voltage. The secondary battery 18 and the vehicle battery 12 often have different voltages, but may, in certain embodiments, have approximately the same voltage when fully charged. In one embodiment, the secondary battery 18 is a set of series-connected, sub-C size, NiCd battery cells, although other cell sizes and battery types (e.g., Li-ion, Li-polymer) may be used. Generally, the size, type, and number of secondary battery cells are selected based on accessory operation requirements. Moreover, the number of cells is also selected in consideration of charging requirements. For instance, individual cell terminal voltage rises when fast-charging Ni—Cd cells, such that the charging voltage should be a total of 1.9 Volts per cell plus 1.5 Volts.

With continuing reference to the exemplary embodiment of FIG. 1, the secondary battery 18 powers a vacuum cleaner system depicted as a single motor 20 for ease in illustration. The motor 20 is coupled to the secondary battery 18 via a switch 22 made available to a user for controlling operation of the vacuum cleaner system. In this embodiment, the secondary battery 18 is coupled to the common element of the switch 22, such that charging of the secondary battery 18 occurs when the motor 20 is not operating, i.e., when the switch 22 is in the off position. Conversely, charging is discontinued while the motor 20 is running. The switch 22 may be otherwise configured to allow for differing or additional operational modes, and switches other than the two-position switch 22 shown in FIG. 1 may be used, as desired. Moreover, the switch 22 may be a relay or other device incorporating a switch or other control element remotely located from the system 10, such as in a vehicle dashboard or other location convenient for the user. More generally, the switch 22 may be one of multiple switches controlling various motors or other aspects of the vacuum cleaner system. Additional switches, or alternative switch configurations, may be desirable in the event of additional operational modes, such as a mode during which the secondary battery 18 is charged while the motor 20 is powered.

The vacuum cleaner system or other accessories powered by the secondary battery 18 may be disposed in the vehicle in any manner, as desired. The vacuum cleaner system may be semi-detachably mounted such that the motor 20 or other vacuum cleaner components may be portable. To this end, one or more of the components of the system 10 may be integrated with a portion of the vehicle interior as a manufacturer-installed accessory.

In one exemplary embodiment, the vacuum motor 20 is designed to run on 18 Volts DC to provide a power level adequate for typical levels of vacuum cleaner performance. However, other motors of differing sizes and voltage requirements may be used as well. For instance, a vacuum cleaner system having a motor that runs on about 12 Volts may be selected in the interest of consistency with the typical voltage provided by the vehicle battery 12. In the 18-Volt example, fifteen Ni—Cd cells are used to compose the secondary battery 18, thereby requiring a fast-charging voltage of about 30 Volts with current levels of approximately 2300-2500 mA per hour.

To provide the requisite charging current at the appropriate voltage, a battery charger control circuit 24 couples the vehicle battery 12 to the secondary battery 18 when the switch 22 is in the charging position, as it is shown in FIG. 1. In the exemplary embodiment of FIG. 1, the control circuit 24 is continuously connected to the vehicle battery 12 even though charging may be called for via the switch 22 only intermittently. Such continuous connection allows the vehicle battery 12 to be monitored under all conditions. In alternative embodiments, the control circuit 24 may be part of a detachable assembly such that the connection is temporarily lost. Other embodiments may have a switch or other coupling device to control the connection.

The control circuit 24 includes a voltage detector 26 to monitor the condition of the vehicle battery 12. The voltage detector 26 intermittently samples the terminal voltage of the vehicle battery 12, which may be particularly useful in embodiments where the control circuit 24 is continuously connected to the battery 12, as shown in FIG. 1. In this manner, monitoring of the vehicle battery 12 does not present a significant drain on battery capacity. In one embodiment, the voltage detector 26 utilizes a strobing technique based on an oscillator 28 that sets a low sampling frequency, such as about 1-5 Hz. More generally, the sampling may occur at regular or irregular intervals, such that the sampling rate or frequency may be modulated in accordance with operating conditions or other considerations, as desired. Other embodiments need not involve voltage monitoring or detection schemes that rely on or include either strobing, such as where the control circuit 24 is not continuously connected to the vehicle battery 12, or sampling, such as where the power drain from monitoring the source voltage continuously is not a significant concern.

A number of different commercially available voltage detection devices may be used as, or in connection with, the voltage detector 26. Such devices may involve any combination of circuitry, other hardware, and software. Generally speaking, however, the voltage detector 26 generates one or more output signals carrying information indicative of the condition or voltage of the vehicle battery 12. The one or more output signals are used to select one of a plurality of operational or charging modes for the control circuit 24 such that the charging mode is selected based on, or in accordance with, the condition (e.g., terminal voltage) of the vehicle battery 12. Depending on the type of voltage detection device, the information provided by the voltage detector 26 may be supplied in digital or analog form and, in either case, may be provided over one or more lines.

In certain embodiments, the control circuit 24 includes mode-select logic circuitry 30 in communication with the voltage detector 26. The mode-select logic circuitry 30 is responsive to the one or more signals generated by the voltage detector 26 to generate, in turn, control signals indicative of the operational or charging mode. The manner in which the circuitry 30 generates the control signals depends on whether the one or more signals generated by the voltage detector 26 are analog or digital, or incorporate one or more voltage threshold comparisons. The mode-select logic circuitry 30 may be particularly useful in embodiments where the signals generated by the voltage detector 26 are solely indicative of a voltage magnitude. The mode-select logic circuitry 30 may also be useful in connection with voltage detectors that generate one or more signals indicative both of voltage and a voltage comparison with certain thresholds. In such cases, the mode-select logic circuitry 30 may analyze or process the signal(s) to generate one or more control signals indicative of the charging mode. In alternative embodiments, the voltage detector 26 generates such control signals directly, such that the voltage detector 26 effectively has the mode-select logic integrated therein.

The different charging modes of the control circuit 24 provide a flexible approach to charging the secondary battery 18. For instance, a charging mode having a lower charging rate may enable continued charging even though the voltage detector 26 has sensed that the capacity of the battery 12 has begun to degrade. With the voltage detector 26 continuing to monitor the battery 12, the charging then may begin at a higher rate to support a quick charge cycle. If the secondary battery 18 does not reach full charge before detection of voltage level degradation, the charging then continues at the lower rate without the risk of reducing the vehicle battery capacity to a point that would compromise an engine start. To this end, the control circuit 24 includes the mode-select logic either in communication and/or integrated with the voltage detector 26 to toggle or switch between the multiple charging modes. Moreover, the disclosed circuit and system may involve any number of lower and higher charging modes, and is not limited to a two-charging mode approach.

In one exemplary embodiment, the control circuit 24 and, in particular, the voltage detector 26 and the mode-select logic circuitry 30, discriminate between three voltage ranges: (i) below 12.4 Volts; (ii) between 12.4-12.6 Volts; and, (iii) above 12.6 Volts. Thus, three operational modes are available. While one of the operational modes may, in fact, correspond with an absence of charging (i.e., a zero rate of charging), the other two modes establish charging at differing, non-zero rates. The specific levels of the two non-zero rates is a matter of design choice, but generally the differing rates may correspond with low and high charging rates, where the lower charging rate is designed to present a lower risk of detrimental vehicle battery discharge. In certain embodiments, the lower charging rate may be considered a trickle charge. Trickle charging rates may be about 150 mA, but may range both above and below that charging rate, depending on the number of secondary battery cells, vehicle battery capacity, and other considerations apparent to those skilled in the art given the primary battery 12, the secondary battery 18, the control circuit 24, and other aspects of the system. More generally, the trickle charging rate may be set to any rate lower than the maximum charging rate, and need not be limited to industry standard rates such as C/16 (i.e., about 150 mA).

In certain embodiments, the mode-select logic circuitry 30 couples the voltage detector 26 to a charge controller 32, which enables charging in accordance with the selected charging mode. The charge controller 32 drives the charging based on the control signals indicative of the charging mode, which may be generated by either the voltage detector 26 and/or the mode-select logic circuitry 30. Thus, the charge controller 32 and the voltage detector 26 may be coupled via one or more control lines, which may, but need not, be processed by intermediate circuitry, such as the mode-select logic circuitry 30.

The charge controller 32 may include a discrete IC, such as the aforementioned MAX713 fast-charge controller (as shown in FIG. 2) or, alternatively, the similar MAX712 controller, both of which are commercially available from MAXIM Integrated Products. More generally, the charge controller 32 may be any one of a number of different charge controllers either commercially available or known to those skilled in the art, and is not limited to any IC, circuit, or other configuration. For instance, the charge controller 32 may differ depending on the type, nature or capacity of the secondary battery 18 and, thus, should not be limited to the components or configuration described and shown herein.

In one embodiment, the charge controller 32 provides charge controller functionality known to those skilled in the art, including, without limitation, (i) fast and trickle charging rates, (ii) fast-charge cutoff based on voltage slope, temperature, and time, (iii) charging current regulation, and (iv) linear or switch-mode power control. However, one or more of these functions need not be provided by, or integrated into, an IC package. In fact, discrete ICs such as the MAX713 may rely on external components, such as current sense and other resistors, power transistors and diodes, as explained further below and in the MAXIM product specification entitled "MAX712/MAX713: NiCd/NiMH Battery Fast-Charge Controllers," the disclosure of which is hereby incorporated by reference.

In alternative embodiments, the charge controller 32 includes circuitry for additional functionality, such as directly powering a load while charging the secondary battery 18, NiMH charge control, adjustable trickle charging rates, and the capability of charging any number (e.g., 1 to 16) of cells. Some of these capabilities may be provided by the MAX713 IC when configured in a manner other than that shown in FIG. 2. In any event, the nature and details of the circuitry necessary to implement such charge control functionality are well understood by those skilled in the art given, for instance, the relevant product specification materials and the teachings of the present invention.

In embodiments where the secondary battery 18 has a different voltage than the vehicle battery 12, the control circuit 24 also includes a boost converter 34 coupled to the charge controller 32. The boost converter 34 also may be useful when a fast charging scheme provided by the charge controller 32 causes the cell voltages to rise during charging, as set forth above. The boost converter 34, or step-up DC-DC controller or regulator, is generally configurable or adjustable to provide a charging current in accordance with the current driven or supplied by the charge controller 32 and at a voltage level appropriate for the secondary battery 18. As is well known to those skilled in the art, the boost converter 34 may be a switching converter, such that the charging voltage (e.g., 30 Volts) may be provided in cyclical fashion.

With reference now to FIG. 2, where elements common to multiple figures are identified with like reference numerals, an exemplary embodiment of the control circuit 24 (FIG. 1) is shown in greater detail in connection with other components of the electrical system 10, such as the vehicle battery 12 and the secondary battery 18. In this embodiment, the components of the control circuit 24 shown in FIG. 1 (i.e., voltage detector, charge controller, etc.) are established with respective, discrete ICs. Discrete ICs, however, are not necessary, but rather provide one convenient, off-the-shelf approach. In this exemplary embodiment, the voltage detector 26 includes a window comparator IC 50 that samples the voltage of the vehicle battery 12 to select the operational mode. The charge controller 32 includes a fast-charge controller IC 52, and the boost converter 34 includes a DC-DC converter IC 54. Apart from the respective ICs, the components of the control circuit 24 also include other circuit elements, as described below. For purposes of clarity and ease in description and illustration, the reference numerals of FIG. 1 will be used to refer to the IC and any related circuit elements collectively. The reference numerals 50, 52 and 54 will refer to the ICs individually, it being understood that such related circuit elements may be integrated to a greater or lesser extent into the IC as a matter of design choice. For example, the voltage detector or window comparator 26 includes a number of circuit elements, including the window comparator IC 50 and several resistors that provide voltage divider and other functions. The resistors and other elements related to the window comparator 26 will be further described in connection with the operation of the window comparator 26.

Using the window comparator 26, the disclosed circuit and system discriminates between three voltage levels: (1) a terminal voltage level of 12.6 to 13.8 Volts and above enables a fast-charge mode over, for instance, a full, fast-charge cycle; (2) a terminal voltage level of 12.4-12.6 Volts places the system in a trickle charge mode; and, (3) a terminal voltage below 12.4 Volts places the system into a zero charging rate, or shutdown, mode. When in shutdown mode, the only power drawn by the disclosed system from the vehicle battery 12 is a negligible sampling current drawn at, for instance, one second intervals. These three voltage levels or ranges correspond with three operational modes, i.e., two charging modes and a non-charging mode. The output generated by the window comparator 26 helps to select one of the operational modes.

Monitoring of the voltage level of the vehicle battery 12 is accomplished whenever the control circuit 24, specifically the voltage detector 26 or window comparator 26, is connected. As described above, certain embodiments may provide the option of uninstalling the entire vacuum cleaner system from the vehicle, or providing a mechanism for disconnecting the vacuum cleaner system from the vehicle electrical system. Apart from such or similar instances, the control circuit 24 is connected to the vehicle battery 12 for continual monitoring.

A number of commercially available ICs may be used as the window comparator IC 50, or as two comparator ICs working in tandem to form the window. In one embodiment, the window comparator IC 50 is a window comparator available from Linear Technology (Milpitas, Calif.; www.linear.com) under the product name LTC 1042N. This window comparator IC 50 places a very slight load (e.g., on the order of 0.48 µW) on the vehicle battery 12 by using a strobing technique to read the input voltage only during a short (e.g., 80 µsec) sampling period. During the sampling period, power is turned on to the window comparator IC 50, input voltage values are read and stored in internal CMOS output latches, and then power to the comparator IC 50 is turned off until the next sample cycle. The sampling rate can be set as low as, for instance, about once every second to minimize power dissipation almost to the point of being arbitrary. In the exemplary embodiment of FIG. 2, the sampling rate is set, in fact, at about 1.0 Hertz. Further details regarding this exemplary embodiment of the window comparator IC 50 may be found in the specification published by Linear Technology and entitled "LTC1042N Window Comparator," the disclosure of which is hereby incorporated by reference.

The voltage detector 26 may alternatively be composed of two separate comparators, either integrated into respective chips or composed of non-integrated components. In either case, the comparators evaluate the voltage of the vehicle battery 12 based on two, respective voltage thresholds. Additional circuit elements to provide output signals similar to those generated from a window comparator will be apparent to those skilled in the art. For instance, alternative configurations or devices for the voltage detector or window comparator 26 may include one or more discrete IC voltage detectors providing single threshold functionality.

With continued reference to the exemplary embodiment of FIG. 2, the sampling rate is established by an RC circuit having a resistor 56 and a capacitor 58, which self-strobes an internal circuit of the IC 50. The RC circuit is connected to the OSC pin (i.e., oscillator) of the window comparator IC 50. The RC circuit operates with circuitry internal to the window comparator IC 50 to provide the oscillator 28. Alternatively, the device may be externally strobed by driving the OSC pin of the IC 50 with a CMOS or other gate (not shown).

The window comparator 26 includes voltage-divider resistors 60 and 62 to set the width of the voltage window, and a resistor 64 and a Zener diode 66 to set the mid-point, or center, of the window. Two high-impedance inputs at the WC pin (i.e., window center) and at the WID2 pin (i.e., width/2) are supplied the voltages developed by these elements. For the exemplary voltage ranges given above, the window width is 0.2 Volts and the window center is 12.5 Volts. However, the window comparator 26 is configured to evaluate the vehicle battery 12 at half of the terminal voltage level. In other words, a voltage divider having resistors 68 and 70 divides the voltage level in half before being delivered to the VIN pin of the window comparator IC 50. This allows the vehicle battery 12 to act as the power supply for the window comparator IC 50 despite being the monitored voltage as well. To that end, the terminal voltage of the vehicle battery 12 is applied to the V+ pin of the window comparator IC 50. As a further consequence, the window width is set to about 0.1 Volts (i.e., half of the actual 0.2 Volts between 12.4 and 12.6 Volts) and the window center is about 6.25 Volts.

To set a window width of about 0.1 Volts, the exemplary embodiment of FIG. 2 includes the voltage divider provided by the resistors 60 and 62, the voltage divider being configured to supply a voltage of approximately 0.04-0.05 Volts to the WID2 pin. In this case, the Zener diode 66 has a breakdown voltage of 6.2 Volts, which would effectively set the window center at 12.4 Volts. However, the window may be re-centered or otherwise adjusted to, for instance, 6.25 Volts using the resistor 68. The Zener diode 66 may have a tolerance of 1.0%. The foregoing voltage window characteristics and corresponding component values are presented with the understanding that they may vary between different embodiments or applications of the teachings of the present invention.

In this embodiment, the window comparator 26 generates two output signals indicative of the voltage of the vehicle battery 12. The first signal is indicative of whether the voltage is above the window, and is provided at the ABOV pin (i.e., above) of the window comparator IC 50 on a line 72. The second signal is indicative of whether the voltage is within the window, and is provided at the WITH pin (i.e., within) of the window comparator IC 50 on a line 74. In this embodiment, each of these output signals is digital in the sense that a high or active output (e.g., 5 Volts) indicates that the voltage is within the range in question. Taken together, the states of these two signals are utilized to determine the operational mode of the control circuit 24. If both are low or inactive, then the vehicle battery 12 is below the voltage window. When one or the other goes active or high, the vehicle battery 12 is either within or above the window. In this manner, the vehicle battery terminal voltage determines the collective state of the signals, which, in turn, determine or select the operational mode.

The exemplary embodiment of FIG. 2 includes mode-select control logic (see, e.g., element 30 of FIG. 1) used to evaluate the two control signals. Part of such logic is integrated in the window comparator 26 in this embodiment, insofar as the two control signals on the lines 72 and 74 already represent the logic involved in the window comparisons. As a result, the signal on the line 74 is essentially supplied directly to the charge controller IC 52, with the exception of signal conditioning in the form of a voltage divider based on resistors 76 and 78. In alternative embodiments, the voltage detector 26 may generate an analog or digital representation of the vehicle battery terminal voltage, which then must be processed by comparator logic to generate the two control signals. The degree to which the voltage detector 26 incorporates, or does not incorporate, the mode-select logic is a matter of design choice. In the embodiment of FIG. 2, the voltage detector 26 includes the comparator logic, but leaves a remainder of the mode-select logic 30 for external components. That is, a portion of the mode-select logic 30 is external to the window comparator 26 in the sense that additional logic circuit elements couple the window comparator 26 and the charge controller 32. More specifically, the mode-select control logic 30 includes (i) a diode OR gate formed by first and second diodes 80 and 82, and (ii) a control switch 84. The diodes 80 and 82 may be any type of low-power diode, such as the 1N4148 diode IC commercially available from Diodes, Inc. (Westlake Village, Calif.). The diodes 80 and 82 may be packaged as two separate, discrete diodes or, alternatively, packaged in a single IC device. The control switch 84 may be a power MOSFET such as the IRLR2905Z MOSFET commercially available from International Rectifier (El Segundo, Calif.).

In operation, the diodes 80 and 82 provide a high or active signal to the gate of the control switch 84 when the terminal voltage of the vehicle battery 12 is either within or above the voltage window established by the window comparator 26. The diodes 80 and 82 thus assure that a gate drive is provided to the control switch, or MOSFET, 84 in both the trickle charge and fast-charge operational modes. Consequently, a voltage above 12.4 Volts activates the control switch 84, which establishes a ground connection for the charge controller 32 and the DC-DC converter 34 along a line 86. Without the ground connection, these components of the control circuit 24 are not powered, and charging of the secondary battery 18 does not occur, meaning that the control circuit 24 is in the shutdown (or non-charging) mode. When those components are powered, the signal generated on the line 74 is determinative of which one of the two charging modes the control circuit 24 will operate in. If the terminal voltage of the vehicle battery 12 is above the voltage window, then the output on the line 74 is inactive, and the resistor 78 pulls a line 88 coupling the window comparator 26 to the charge controller IC 52 to ground.

The mode-select logic circuit 30 also includes a resistor 89 that helps to stabilize the signal provided to the gate of the switch 84. Without the resistor 89, small voltage fluctuations due to noise in the control circuit 24 may be sufficiently sizeable to provide a false signal that activates the MOSFET and undesirably causes the control circuit 24 to charge the secondary battery 18, thereby discharging the vehicle battery 12 during periods when the charge controller 32 should be in the shutdown or non-charging mode.

With continued reference to the exemplary embodiment of FIG. 2, the charge controller IC 52 is coupled to the window comparator 26 for charging in accordance with the selected charging mode. The charge controller IC 52 is a pin-programmable IC having a number of control input ports, including pins for programming the number of cells. (PM0, PM1), fast-charge timeout (PM2, PM3), trickle/fast-charge current ratio (PM3), and full charge detection scheme (TMP). The charge controller IC 52 may also be programmed to switch from the fast-charge mode to the trickle charge mode via an under-temperature comparison (pin TLO), an over-temperature comparison (pin THI), and a battery voltage level threshold detection (pins BT+, BT−). The programming of the charge controller IC 52 may vary considerably based on the charging and other requirements of the secondary battery 18, as well as the load powered thereby. Further details regarding its operation and pin-programming options will be well known to those skilled in the art based on the above-referenced specification publication available from the manufacturer. Consequently, the operation of the charge controller IC 52 will not be described in detail herein.

Of the several ways in which the charge controller IC 52 may be directed to switch between charging modes, the exemplary embodiment of FIG. 2 utilizes the temperature threshold pin, TLO (despite not utilizing a temperature-indicative control signal). Instead, the control signal on the line 88 is delivered to the TLO pin of the charge controller IC 52. In operation, the TLO pin is pulled to ground by the resistor 78 unless driven by the control signal on the line 74 from the window comparator IC 50, meaning that the default mode for the charge controller IC 52 is the fast charge mode. However, if the TLO pin is above 2.00 Volts (a reference provided internally in the charge controller IC 52), fast charging is disabled. This is the case when the WITH pin of the window comparator IC 50 is high or active, indicating the vehicle battery is between 12.4 and 12.6 volts. Alternately, if the TLO pin starts out low or goes low any time after power up, then fast charging is enabled. For example, when the ABOV pin of the window comparator IC 50 goes high, indicating battery voltage is 12.6 or above, the WITH pin will coincidentally go low, enabling fast charge.

The charge controller IC 52 provides a negative slope detection option for detecting when the secondary battery 18 is fully charged. Other available approaches include options that utilize an external thermistor connected to the TEMP pin, which is not utilized in this embodiment. The negative slope detection involves a voltage-slope detecting analog-to-digital converter internal to the charge controller IC 52 and made available between the BT+ and BT− pins, which are coupled to the positive and negative terminals of the secondary battery 18, respectively. Throughout the charging process, the voltage across the secondary battery 18 will rise until a peak is reached. Once that peak is reached, the charge controller IC 52 switches to the trickle mode. More specifically, when Ni-Cd cells are fully charged, their terminal voltage will dip slightly below the peak level. This voltage dip, or negative slope, is detected by the charge controller IC 52, causing the fast charge mode to terminate until power is cycled. The fast charging process may otherwise last up to 66 minutes, i.e., the default timeout period that may be modified via pin programming.

The charge controller IC 52 also provides a mechanism for providing operational feedback to a user. When in the fast-charge mode, the pin FSG of the charge controller IC 52 acts as a current sink, enabling current to flow from the positive terminal 14 of the vehicle battery 12 through a single LED status indicator 90 and a current-limiting resistor 92. The indicator 90 is ON only during the fast-charge cycle. While any number of status indicators or other information may be displayed to a user, the number of status indicators may be limited to minimize any additional burden on the vehicle battery 12 while the vehicle is not running.

The manner in which the charge controller 32 enables charging in accordance with one of the charging modes will now be described. With the charge controller IC 52 of FIG. 2, the charge controller 32 may be configured in a switch-mode configuration or a linear mode configuration. In the exemplary embodiment of FIG. 2, the charge controller 32 is configured in the linear mode to facilitate simulation of a single BJT power transistor as described in the above-referenced specification publication for the charge controller IC 52. Alternative embodiments may be configured in the switch mode when use of a single BJT is not practical due to excessive heat or power dissipation, such as when higher output currents are required or when directly charging a battery in a non-boost mode.

With continued reference to FIG. 2, the linear-mode configuration of the charge controller 32 may use a current mirror to simulate the load of the BJT power transistor. The current mirror is coupled to an output port (i.e., the DRV pin) of the charge controller IC 52, where either trickle or fast charge output is generated. The current mirror includes two PNP transistors 94 and 96, which may be housed in a transistor package such as 2N3906 available from National Semiconductor (Santa Clara, Calif.). In embodiments having PNP transistors, the output of the charge controller 32 is, in fact, a current sink. Alternative embodiments may include other transistor types or configurations, together with any accompanying circuitry to accommodate such transistor types or configurations. Returning to the exemplary embodiment of FIG. 2, the output port of charge controller IC 52 is the DRV pin and the transistors 94 and 96 present a current follower for the current controlled or generated at the output port. The respective currents in the two branches of the current mirror having resistors 98 and 100 are thus equal, and a line 102 taps the current mirror to drive a power MOSFET 104 via a gate resistor 106. The current flowing through the transistor 96 and a resistor 108 sets the voltage on the line 102, thereby determining the on-resistance of the MOSFET 104. In this manner, the drive current controlled by the charge controller IC 52 in accordance with the selected charging mode controls the charging current generated by the step-up, DC-DC converter 34. For example, when the control circuit 24 is in the trickle mode, a low current (e.g., 30 mA) is provided to the current mirror, which produces a low voltage in the collector of transistor 96, such that MOSFET 104 will conduct lightly (i.e., high on-resistance). As will be described further below, the current flowing through the MOSFET 104 of the step-up converter 34 is the charging current for the secondary battery 18.

In alternative embodiments, the charge controller 32 does not include a current mirror, but rather the single PNP pass transistor referred to hereinabove. This charging circuit, however, is better suited for a non-boost scheme, i.e., one in which the functionality provided by the boost converter 34, as described further hereinbelow, is not utilized.

In embodiments where the charging voltage is higher than the source voltage level provided by the vehicle battery 12 (e.g., 12 Volts), the charge controller IC 52 is used in conjunction with the DC-DC step-up converter 34 such that the maximum battery voltage of the secondary battery 18 may rise above the power supply voltage provided to the charge controller IC 52. The use of the charge controller IC 52 in the linear mode and in connection with the above-described current mirror arrangement supports coupling it to the boost converter 34. In alternative embodiments, the drive current from the charge controller IC 52 may be directly supplied to the secondary battery 18, such as when the secondary battery 18 reaches a maximum charging voltage 1.5 Volts less than source voltage for the charge controller IC 52, which is set at the V+ pin via a resistor 109 and stabilized via a capacitor 110. The above-referenced specification for the charge controller IC 52 may be consulted for further information regarding such instances.

The boost converter 34 is coupled to the charge controller IC 52 via the MOSFET 104. As a switching boost converter, the boost converter arrangement also includes a switching power MOSFET 111, charging inductor 112, Schottky diode 114, and capacitor 116, coupled in the manner customary for providing a pulsed charging current at a frequency of, for instance, 300 kHz. At such high frequencies, these components may be selected for the capability of turning off quickly during the portions of the charging cycle. For instance, the capacitor 116 may consist of a solid electrolyte type and, thus, have a very low impedance. Moreover, these and other components of the boost converter 34 may have component values to support various levels of charging capacity, as desired. More generally, the boost converter 34 may include a high-current converter (i.e., a boost converter having high current capacity) in embodiments where the secondary battery 18 is charged during operation of the motor 20 (or other load).

As the switching aspect of the boost converter 34 of the exemplary embodiments shown in the figures is well known to those skilled in the art, its operation will only be briefly described herein and in connection with the configuration of the DC-DC converter IC 54. In short, whenever the step-up switching controller IC 54 is powered, it attempts to drive the MOSFET 111 at maximum output via its output port (pin EXT). The output port of the DC-DC converter IC 54 provides an oscillating output on a line 118 to the gate of the MOSFET 111. During the portion of the cycle that the MOSFET 111 is on, current is flowing effectively to ground through the inductor 112, which consequently quickly energizes. At this point, the diode 114 is preventing the secondary battery 18 from discharging to ground. The diode 114 also isolates the accumulated charge (from a prior cycle) on the capacitor 116 from a similar discharge path. The capacitor 116 and its accumulated charge instead charges the secondary battery 18 with a smooth charging current (i.e., with a reduced ripple). The other portion of the cycle then occurs once the switching output causes the MOSFET 111 to open. At that point, the voltage across the inductor 112 collapses, and the voltage between the inductor 112 and the diode 114 goes to the positive terminal of the vehicle battery 12 (e.g., 12-14 Volts). With the diode 114 forward biased, the current flowing through the inductor 112 rapidly charges the capacitor 116, storing sufficient energy to charge the capacitor 116 to a voltage higher than the level of the vehicle battery 12. In this manner, the boost converter 34 boosts the charging voltage to a level (e.g., 30 Volts) higher than the source voltage level.

The step-up, DC-DC converter IC 54 may be a MAX1771 controller available from Maxim Integrated Products configured in a conventional fashion. Further details regarding its operation may be found in the manufacturer-published specification entitled "MAX1771: 12V or Adjustable, High-Efficiency, Low IQ, Step-Up DC-DC Controller," the disclosure of which is hereby incorporated by reference. In short, the DC-DC converter IC 54 is configured to drive the MOSFET 111 at maximum power by setting a sufficiently low threshold for full-on operation via the feedback input pin (i.e., FB pin). More specifically, resistors 120 and 122 form a voltage divider to set the low threshold.

Despite being driven at full-on operation, the current through the MOSFET 111 is controlled via the on-resistance of the MOSFET 104, which, in turn, is set via the current mirror and the output from the charge controller 32. When the control circuit 24 is in trickle mode, the on-resistance of the MOSFET 104 is high, which limits the amount of current flowing through the charging inductor 112, which, in turn, limits the amount of charge stored on the capacitor 116 during each cycle.

The power MOSFETS 104 and 111 may be any type of switching transistor that is suitable for use at switching frequencies and current levels encountered in step-up, DC-DC applications, such as the MOSFET available from International Rectifier (El Segundo, Calif.) under the product name, IRL1 104. The power MOSFETS 104 and 111 may, but need not, be the same transistor type, and may be disposed on the same integrated circuit. The power MOSFETs may also have an intrinsic ON resistance, or $R_{ds}$, suitable for significant power handling.

The fast-charge mode current may be supported by selecting components having ratings suitable for the fast-charge current (e.g., 2.5 A). For instance, the inductor 112, diode 114 and capacitor 116 may be rated for 2.5 A or higher current levels. For instance, in the exemplary embodiment of FIG. 2, the inductor 112 may be the inductor commercially available from Sumida (Chuo-ku, Tokyo, Japan) under the product name CDRH127-470MC, which is rated for current levels of 2.5 A due to suitable wire gauge and insulation. The diode 114 may be rated for current and voltage levels as high as 3.0 A and 40 Volts, respectively.

The boost converter 34 also includes a 30-Volt Zener diode 122 (1N4751A) to limit the maximum voltage produced by the converter 34 during the portions of the charging cycle when the secondary battery 18 is not connected. Any one of a number of commercially available diodes may be used for the Zener diode. 122, such as the 1N4751A available from Diodes, Inc. (Westlake Village, Calif.). The Zener diode 122 may be rated for 1 Watt.

The charge controller 32 and the boost converter 34 may have several other circuit elements used to control, condition, or generate the signals provided to, or generated by, one or more input or output ports or transistor gates. For example, capacitors 124, 126, 128, 130,132, and 134 of the exemplary embodiment of FIG. 2 are used to, for instance, stabilize the signals on respective lines leading to the input ports or gates. These capacitors may also have one or more additional purposes, as will be apparent to one skilled in the art. The above-identified circuit components or elements may have the following values or specifications, it being understood that the values or specifications are exemplary only and may vary from those shown and still embody the disclosed circuit and system.

| | |
|---|---|
| Resistor 56 | 470 kOhms |
| Capacitor 58 | 1.0 µF, 25 V |
| Resistor 60 | 300 kOhms |
| Resistor 62 | 1 kOhms |
| Resistor 64 | 75 kOhms |
| Resistor 68 | 33 kOhms, 0.25% |
| Resistor 70 | 33 kOhms, 0.25% |
| Resistor 76 | 300 kOhms |
| Resistor 78 | 150 kOhms |
| Resistor 89 | 100 kOhms |
| Resistor 92 | 2.2 kOhms |
| Resistor 98 | 10 Ohms |
| Resistor 100 | 10 Ohms |
| Resistor 106 | 100 kOhms |
| Resistor 108 | 150 Ohms |
| Resistor 109 | 560 Ohms |
| Capacitor 110 | 0.1 µF |
| Capacitor 116 | 330 µF, 35 V |
| Resistor 120 | 20 kOhms |
| Resistor 122 | 20 kOhms |
| Capacitor 124 | .22 µF |
| Capacitor 126 | 0.01 µF |
| Capacitor 128 | 0.1 µF |
| Capacitor 130 | 1000 pF |
| Capacitor 132 | 220 µF, 16 V |
| Capacitor 134 | 100 pF |

All resistors in the exemplary embodiment of FIG. 2 may be rated for 0.25 Watt operation and 5% value tolerance, with the exception of those noted above.

The charge controller IC 52 may regulate the charging current by monitoring and regulating the voltage across a sense resistor 136 (e.g., 0.1 Ohms, rated for 1 Watt). The sense resistor 136 helps to set the fast-charge current level and, in the exemplary embodiment having the MAX713 IC as the charge controller IC 52, the voltage drop across the sense resistor 136 is regulated to 250 mV.

With reference to the exemplary embodiment of FIG. 2, the number of cells in the secondary battery 18 makes it possible for the maximum voltage to exceed the rating for the BT+ pin. Specifically, the BT+ pin of the charge controller IC 52 may be rated for handling voltages associated with, for instance, only 11 NiCd cells when the IC 52 is not powered (e.g., when the control switch 84 disconnects the IC 52 from the power source). Consequently, the IC 52 may be protected during such periods via a transistor 138. With the IC 52 not grounded, the transistor 138 will be turned off because its return is blocked. Once the IC 52 is powered, the BT+ pin can be connected to the positive terminal of the secondary battery 18 via the transistor 138. The connection is enabled by the application of the primary battery voltage to the base of the transistor 138 via a resistor 140. The transistor 2N3904 from National Semiconductor (Santa Clara, Calif.) may be used as the transistor 138.

In alternative embodiments, the diode-based OR gate of the mode-select logic circuitry may be replaced with a transistor-based configuration. Such embodiments may, but need not, involve coupling the voltage detector to the charge controller in a different manner, and one that does not establish power via a switched connection to ground. For instance, the power connection may be established by coupling the positive terminal 14 of the vehicle battery 12 to the charge controller IC 52 and boost converter 34 via one of the transistors in the mode-select circuitry. Instead of using the low temperature comparison to toggle between charging modes, such alternative embodiments may use a control signal provided to the high temperature comparison input port of the charge controller IC 52.

In other alternative embodiments, the logic provided by the OR gate and control switch 84 may be integrated into the voltage detector 26, or the window comparator IC 50, to any extent, as desired.

Other types of boost converters or DC-DC converters known to those skilled in the art may be used to step up the charging voltage in connection with the battery charger circuit given the teachings of the present invention, including single-ended pulse inverting converters (or SEPIC converters) and flyback converters.

In accordance with the above-described embodiments, the disclosed circuit and system regulates the discharge of the vehicle battery 12 by monitoring the terminal voltage across the battery terminals 14 and 16 and regulating the charging of the secondary battery 18 based on the measured terminal voltage. In this manner, the charging rate may be adjusted based on the condition of the vehicle battery 12. A high charging rate may enable a charging of the secondary battery 18 from depletion to full charge in a reasonable time period, such as one hour. An adjustment to a lower charging rate may allow continued charging of the secondary battery 18, where higher rates may risk compromising vehicle battery capacity for engine start.

Practice of the disclosed system and circuit is also not limited to the types of batteries used as the primary and secondary batteries. Furthermore, in certain embodiments, the power source need not be a battery. Thus, the disclosed system and circuit may be applied in connection with any rechargeable battery to be recharged under circumstances where the condition of the source voltage should be monitored to ensure that the power source is not adversely affected by the charging operation.

The control circuit 24 may be built or manufactured in accordance with any circuit fabrication or design methodology and materials. In one embodiment, the circuit 24 is built on a standard FR-4 PC board with very small surface mount components such that the board dimensions are approximately 2" by 3" by 1". However, practice of the disclosed circuit and system is not limited to any particular circuit board implementation, nor is it limited to embodiments having surface mount components. Alternative embodiments may integrate some or all of the components in an application-specific integrated circuit (ASIC) or similar integrated configuration of either current or future design. Some embodiments may also utilize software executed by a general-purpose or other processor to implement any portion of the control logic embodied in the circuits and/or circuit components shown in connection with the voltage detector 26, the charge controller 32, or other elements of the battery charging control circuit. For instance, although the mode select logic circuitry 30 is shown and described as implemented in IC and component hardware, any combination of circuitry, other hardware, and software may be utilized, as will be understood by those skilled in the art.

The foregoing description is given for clearness of understanding only, and no unnecessary limitations should be understood therefrom, as modifications within the scope of the invention may be apparent to those having ordinary skill in the art.

What is claimed is:

1. A battery charger control circuit, comprising:
   a window comparator configured to detect a voltage level of a power source and to compare the voltage level against a predetermined range to generate a first control signal and a second control signal indicative of the voltage level of the power source,
   the first control signal and second control signal logically combined to generate a third signal coupled to a control switch that enables charging using any one of a first charging mode or a second charging mode used in charging a battery from the power source;
   a charge controller coupled to the window comparator, configured to enable charging the battery in accordance with one of the first charging mode or the second charging mode based on the first control signal or the second control signal indicative of the voltage level of the power source; and,
   wherein the first and second charging modes establish charging from the power source to the battery at differing, non-zero rates.

2. The battery charger control circuit of claim 1, wherein the first and second control signals generated by the window comparator are configured to indicate whether the power source voltage level is below, within, or above the predetermined range which is a voltage window set by the window comparator.

3. The battery charger control circuit of claim 2, wherein the control switch is configured to determine whether the charge controller should be powered based on whether the first and second control signals indicate that the source voltage level is below the voltage window.

4. The battery charger control circuit of claim 3, further comprising an OR gate responsive to the first and second control signals to drive the control switch.

5. The battery charger control circuit of claim 1, wherein the charge controller comprises a fast-charge controller integrated circuit such that the first and second charging modes correspond with trickle and fast charging, respectively.

6. The battery charger control circuit of claim 5, wherein a signal of the voltage level of the power source is provided to a temperature threshold pin of the fast-charge controller integrated circuit to disable fast charging.

7. The battery charger control circuit of claim 1, further comprising a step-up, DC-DC controller coupled to the charge controller.

8. The battery charger control circuit of claim 7, wherein the step-up, DC-DC controller comprises a switching regulator.

9. A battery charger control circuit, comprising:
   a window comparator configured to detect a voltage level of a power source and to compare the voltage level against a predetermined range to generate a first control signal and a control second signal indicative of a voltage level of the power source,
   the first control signal and second control signal logically combined to generate a third signal coupled to a control switch that enables charging using any one of a first charging mode or a second charging mode,
   wherein the first charging mode and the second charging mode are configured to charge a battery from the power source; and,
   a charge controller coupled to the window comparator, configured to enable charging in accordance with one of the first charging mode or the second charging mode based on the first control signal or the second control signal indicative of the voltage level of the power source;
   wherein the first and second charging modes establish charging from the power source to the battery at differing, non-zero rates, as determined by the first control signal or the second control signal;
   wherein the window comparator comprises an oscillator to enable sampling of the source voltage level.

10. The battery charger control circuit of claim 1, wherein the first and second charging modes are two of a plurality of operational modes of the battery charger control circuit, the plurality of operational modes including a non-charging mode, and wherein the window comparator is connected to the source battery to monitor the source voltage level regardless of the operational mode of the battery charger control circuit.

11. A vehicle electrical system having a primary battery with a terminal voltage, the vehicle electrical system comprising:
    a secondary battery; and,
    a control circuit configured to couple the secondary battery to the primary battery to control recharging of the secondary battery via the primary battery, the control circuit comprising:
       a window comparator configured to detect a source voltage level of the primary battery and to compare the source voltage level against a predetermined range to generate a first control signal and a second control signal indicative of the terminal voltage of the primary battery,
       the first control signal and second control signal logically combined to generate a third signal coupled to a switch that enables charging using any one of a first charging mode or a second charging mode,
       wherein the first charging mode and the second charging mode are configured to charge the secondary battery from the primary battery; and,
       a charge controller configured to enable charging of the secondary battery in accordance with one of the first or second charging modes based on the first control signal or the second control signal;
       wherein the first and second charging modes establish charging from the primary battery to the secondary battery at differing, non-zero rates.

12. The vehicle electrical system of claim 11, wherein the first and second control signals generated by the window comparator are configured to indicate whether the source voltage level is below, within, or above a voltage window set by the window comparator.

13. The vehicle electrical system of claim 12, wherein the control switch is configured to determine whether the charge controller should be powered based on whether the first and second control signals indicate that the source voltage level is below the voltage window.

14. The vehicle electrical system of claim 13, wherein the control circuit further comprises an OR gate responsive to the first and second control signals to drive the control switch.

15. The vehicle electrical system of claim 11, wherein the charge controller comprises a fast-charge controller integrated circuit such that the first and second charging modes correspond with trickle and fast charging, respectively.

16. The vehicle electrical system of claim 15, wherein a signal of the voltage level of the source is provided to a temperature threshold pin of the fast-charge controller integrated circuit to disable fast charging.

17. The vehicle electrical system of claim 11, wherein the window comparator comprises an oscillator to enable sampling of the terminal voltage.

18. The vehicle electrical system of claim 11, wherein the window comparator uses the terminal voltage as a power supply.

19. The vehicle electrical system of claim 11, wherein the first and second charging modes are two of a plurality of operational modes of the control circuit, the plurality of operational modes including a non-charging mode, and wherein the window comparator is connected to the primary battery to monitor the terminal voltage regardless of the operational mode of the control circuit.

20. A battery charger control circuit, comprising:
a window comparator to generate first and second signals collectively indicative of whether a source voltage level is below, within or above a voltage window to select one of a plurality of operational modes, wherein the window comparator has an oscillator to establish a sampling rate such that the source voltage level is sampled at the sampling rate to minimize power consumed by monitoring the source voltage level;
mode-select logic circuitry that couples the first and second control signals to produce a third signal that is coupled to a control switch that drives charging using any one of the operational modes; and,
a charge controller coupled to the window comparator to enable charging from a source voltage to a battery in accordance with the selected operational mode.

21. The battery charger control circuit of claim 20, wherein the plurality of operational modes includes first and second charging modes that establish charging at differing, non-zero rates.

22. The battery charger control circuit of claim 21, wherein the plurality of operational modes includes a non-charging mode, and the window comparator is in communication with the source voltage level such that the window comparator monitors the source voltage level during the non-charging mode.

23. The battery charger control circuit of claim 20, the control switch controlled by at least one of the first and second signals to determine whether the charge controller is powered.

24. The battery charger control circuit of claim 23, further comprising an OR gate coupling the window comparator and the control switch such that either one of the first and second signals may activate the control switch to allow the charge controller to be powered.

25. A vehicle electrical system having a primary battery with a terminal voltage, the vehicle electrical system comprising:
a secondary battery; and,
a control circuit configured to couple the secondary battery to the primary battery to control recharging of the secondary battery via the primary battery, the control circuit comprising:
a window comparator configured to detect the terminal voltage of the primary battery and to compare the terminal voltage level against a predetermined range to generate a first control signal and a second control signal indicative of the terminal voltage of the primary battery,
the first control signal and second control signal logically combined to generate a third signal coupled to a switch that drives charging using any one of a first charging mode or a second charging mode; and,
a charge controller configured to enable charging of the secondary battery in accordance with one of the first or second charging modes based on the first control signal or the second control signal indicative of the terminal voltage of the primary battery;
wherein the first and second charging modes establish charging from the primary battery to the secondary battery at differing, non-zero rates;
wherein the charge controller is configured to charge the secondary battery so the secondary battery powers an accessory device when the accessory device is not in an operation mode.

26. The battery charger control circuit of claim 1, wherein the charge controller is configured to maintain a continuous charging, without stopping charging, of the battery from the power source while switching between the first charging mode and the second charging mode.

27. The battery charger control circuit of claim 9, wherein the charge controller is configured to maintain a continuous charging, without stopping charging, of the battery from the power source while switching between the first charging mode and the second charging mode.

28. The vehicle electrical system of claim 11, wherein the charge controller is configured to maintain a continuous charging, without stopping charging, of the secondary battery from the primary battery while switching between the first charging mode and the second charging mode.

29. The battery charger control circuit of claim 21, wherein the charge controller is configured to maintain a continuous charging, without stopping charging, of the secondary battery from the primary battery while switching between the first charging mode and the second charging mode.

30. The vehicle electrical system of claim 25, wherein the charge controller is configured to maintain a continuous charging, without stopping charging, of the secondary battery from the primary battery while switching between the first charging mode and the second charging mode.

31. The battery charger control circuit of claim 2, wherein the window comparator includes at a first comparator and a second comparator that are configured in parallel with respect to a signal indicative of the voltage level of the power source.

32. The battery charger control circuit of claim 10, wherein the window comparator includes at a first comparator and a second comparator that are configured in parallel with respect to a signal indicative of the voltage level of the power source.

33. The vehicle electrical system of claim 12, wherein the window comparator includes at a first comparator and a second comparator that are configured in parallel with respect to a signal indicative of the terminal voltage level of the primary battery.

34. The battery charger control circuit of claim 21, wherein the window comparator includes at a first comparator and a second comparator that are configured in parallel with respect to a first and second signals indicative of the source voltage level of a primary battery.

35. The vehicle electrical system of claim 25, further including a window comparator, wherein the window comparator includes at a first comparator and a second comparator that are configured in parallel with respect to a signal indicative of the terminal voltage level of a primary battery.

* * * * *